(12) United States Patent
Bunce et al.

(10) Patent No.: US 8,565,999 B2
(45) Date of Patent: Oct. 22, 2013

(54) GAS TURBINE ENGINE CONTROL USING ACOUSTIC PYROMETRY

(75) Inventors: Richard H. Bunce, Altamonte Springs, FL (US); Upul P. Desilva, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 470 days.

(21) Appl. No.: 12/967,148

(22) Filed: Dec. 14, 2010

(65) Prior Publication Data

US 2012/0150413 A1     Jun. 14, 2012

(51) Int. Cl.
*G06F 19/00*     (2011.01)
*G06G 7/70*     (2006.01)

(52) U.S. Cl.
USPC ....... 701/100; 701/1; 701/3; 701/99; 73/1.48; 73/29.03

(58) Field of Classification Search
None
See application file for complete search history.

(56) References Cited

U.S. PATENT DOCUMENTS

| | | |
|---|---|---|
| 4,848,924 A | 7/1989 | Nuspl et al. |
| 5,275,553 A | 1/1994 | Frish et al. |
| 6,142,665 A | 11/2000 | Haffner et al. |
| 6,768,938 B2 | 7/2004 | McBrien et al. |
| 7,013,210 B2 | 3/2006 | McBrien et al. |
| 7,383,165 B2 | 6/2008 | Aragones |
| 7,761,216 B2 | 7/2010 | Norris et al. |
| 2007/0027607 A1 | 2/2007 | Norris et al. |
| 2007/0151363 A1 | 7/2007 | Ramsesh |
| 2010/0076698 A1 | 3/2010 | He et al. |

OTHER PUBLICATIONS

Roberto Roubicek; Gas Temperature Measurement in the Fireside of Process Heaters-Using Acoustic Pyrometry; 2003 NPRA Maintenance Conference; 2003; Salt Lake City, Utah.
J.A. Kleppe et al.; The Application of Acoustic Pyrometry to Gas Turbines and Jet Engines; AIAA 98-3611; 1998.
Gustave C. Fralick et al.; Passive Acoustic Tomography Tested for Measuring Gas Temperatures; Research and Technology 2003; May 2004; NASA Glenn Research Center, Cleveland, OH.
Gustave C. Fralick; Acoustic Pyrometry Applied to Gas Turbines and Jet Engines; www.grc.nas.gov/WWW/RT/RT1998/5000/5510; 1998.

*Primary Examiner* — Bhavesh V Amin

(57) ABSTRACT

A method and apparatus for operating a gas turbine engine including determining a temperature of a working gas at a predetermined axial location within the engine. Acoustic signals are transmitted from a plurality of acoustic transmitters and are received at a plurality of acoustic receivers. Each acoustic signal defines a distinct line-of-sound path from one of the acoustic transmitters to an acoustic receiver corresponding to the line-of-sound path. A time-of-flight is determined for each of the signals traveling along the line-of-sound paths, and the time-of-flight for each of the signals is processed to determine a temperature in a region of the predetermined axial location.

20 Claims, 8 Drawing Sheets

GAS TURBINE ENGINE CONTROL USING ACOUSTIC PYROMETRY

FIELD OF THE INVENTION

The present invention relates to temperature measurement in turbine engines and, more particularly, to determination of temperature using acoustic measurements to control a gas turbine engine.

BACKGROUND OF THE INVENTION

Combustion turbines, such as gas turbine engines, generally comprise a compressor section, a combustor section, a turbine section and an exhaust section. In operation, the compressor section can induct and compress ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter indicative of a condition in the combustor section. For example, a controller may monitor a measured turbine exhaust temperature relative to a reference temperature value, and a measured change in temperature may result in the controller changing the fuel/air ratio at the combustor section.

In a known temperature monitoring system for controlling combustion operations, temperature monitors, such as thermocouples, are located directly in the exhaust flow of the turbine. Such monitoring systems generally require locating thermocouples at different fixed axial locations along the exhaust flow, which may introduce uncertainties in relation to temperature calculations for controlling the engine as conditions affecting operation of the engine change, such as a varying load condition on the engine.

SUMMARY OF THE INVENTION

In accordance with an aspect of the invention, a method of operating a gas turbine engine may be provided including determining a temperature of a working gas passing through a flow path within the gas turbine engine. The method comprises transmitting acoustic signals from a plurality of acoustic transmitters located at a predetermined axial location adjacent to and downstream from a last stage of a turbine section of the gas turbine engine, and receiving the acoustic signals from the acoustic transmitters at a plurality of acoustic receivers located at the predetermined axial location. Each acoustic signal may comprise a distinct line-of-sound path from one of the acoustic transmitters to an acoustic receiver corresponding to the line-of-sound path. The method additionally includes determining a time-of-flight for the signals traveling along each of the line-of-sound paths, and processing the time-of-flight for the signals traveling along the line-of-sound paths to determine a temperature in a region of the predetermined axial location.

In accordance with another aspect of the invention, a gas turbine engine may be provided including an apparatus for controlling operation of the gas turbine engine. The apparatus for controlling the gas turbine engine may comprise a plurality of acoustic transmitters located circumferentially on a boundary structure defining a flow path for a working gas passing through the gas turbine engine. The plurality of acoustic transmitters may be located at a predetermined axial location adjacent to and downstream from a turbine section of the gas turbine engine. A plurality of acoustic receivers may be located circumferentially around the boundary structure defining the flow path at the predetermined axial location. A plurality of line-of-sound paths may be defined by acoustic signals, each acoustic signal being transmitted from an acoustic transmitter and received by an acoustic receiver for a respective line-of-sound path. A controller may be configured to determine a time-of-flight for the acoustic signals traveling along each of the line-of-sound paths, and the controller may be configured to process a measured time-of-flight for the signals traveling along the line-of-sound paths to determine a local temperature in each of a plurality of locations located circumferentially around the flow path at the predetermined axial location.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
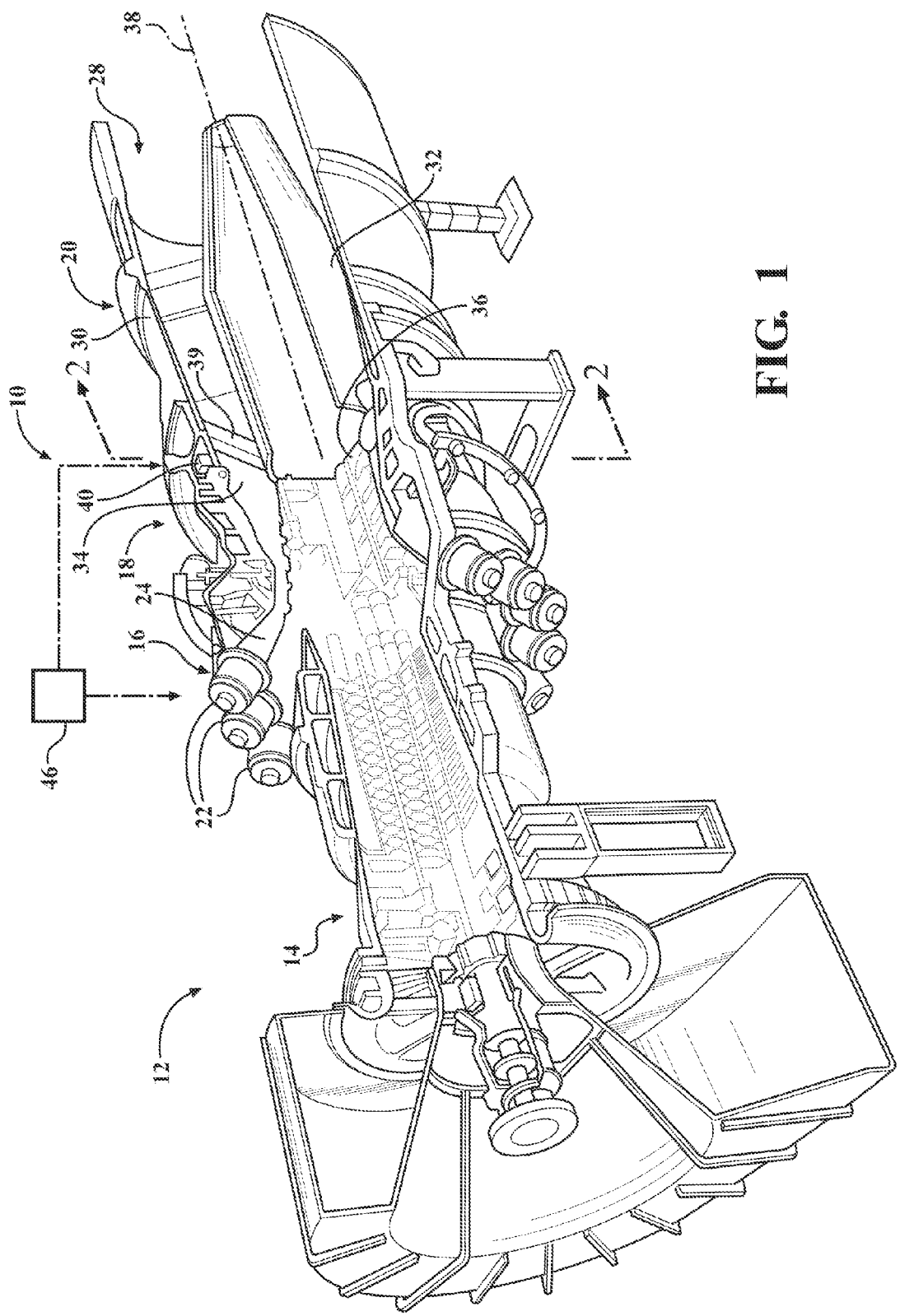
FIG. 1 is a perspective cross-sectional view of a gas turbine engine illustrating implementation of an acoustic pyrometer system of the present invention.

Referring to FIG. 1, embodiments of the invention are directed to an acoustic pyrometer system 10 that may be incorporated in a gas turbine engine 12 and to methods of using the acoustic pyrometer system 10 to determine temperatures at predetermined locations in the engine 12 and to control an operation of the engine 12. Aspects of the invention will be explained in connection with various possible configurations, but the detailed description is intended only as exemplary.

As illustrated in FIG. 1, the turbine engine 12 generally includes a compressor section 14, a combustor section 16, a turbine section 18 and an exhaust section 20. The combustor section 16 may comprise a plurality of combustor baskets or combustors 22 and associated transition ducts 24 for conveying hot working gas to the turbine section 18. The exhaust section 20 may be configured as a diffuser 28, which can be a divergent duct formed between an outer shell 30, defining an outer boundary, and a hub structure 32, defining an inner boundary. The hot working gas is exhausted from the turbine section 18 through the exhaust section 20, i.e., between the outer shell 30 and the hub structure 32, to increase the pressure difference of the exhaust gas expanding across the last stage 34 of the turbine section 16.

The acoustic pyrometer system 10 may be located in an area of the exhaust section 20, adjacent to a rotating row of blades 36 of the last stage 34 of the turbine section 18. Specifically, the acoustic pyrometer system 10 may be located in a measurement plane extending generally perpendicular to a longitudinal axis 38 of the engine 12, i.e., perpendicular to a flow path 39 of the hot working gas, and positioned at a predetermined axial location defined by the line 2-2 in FIG. 1. In a preferred configuration, the acoustic pyrometer system 10 may be located relatively close to the last row of blades 36, and may be located, for example, approximately 3 inches downstream from the last row of blades 36. However, it should be understood that the particular axial location of the acoustic pyrometer system 10 may vary and may be selected depending on the particular design requirements of the engine 12.

Figure 2:
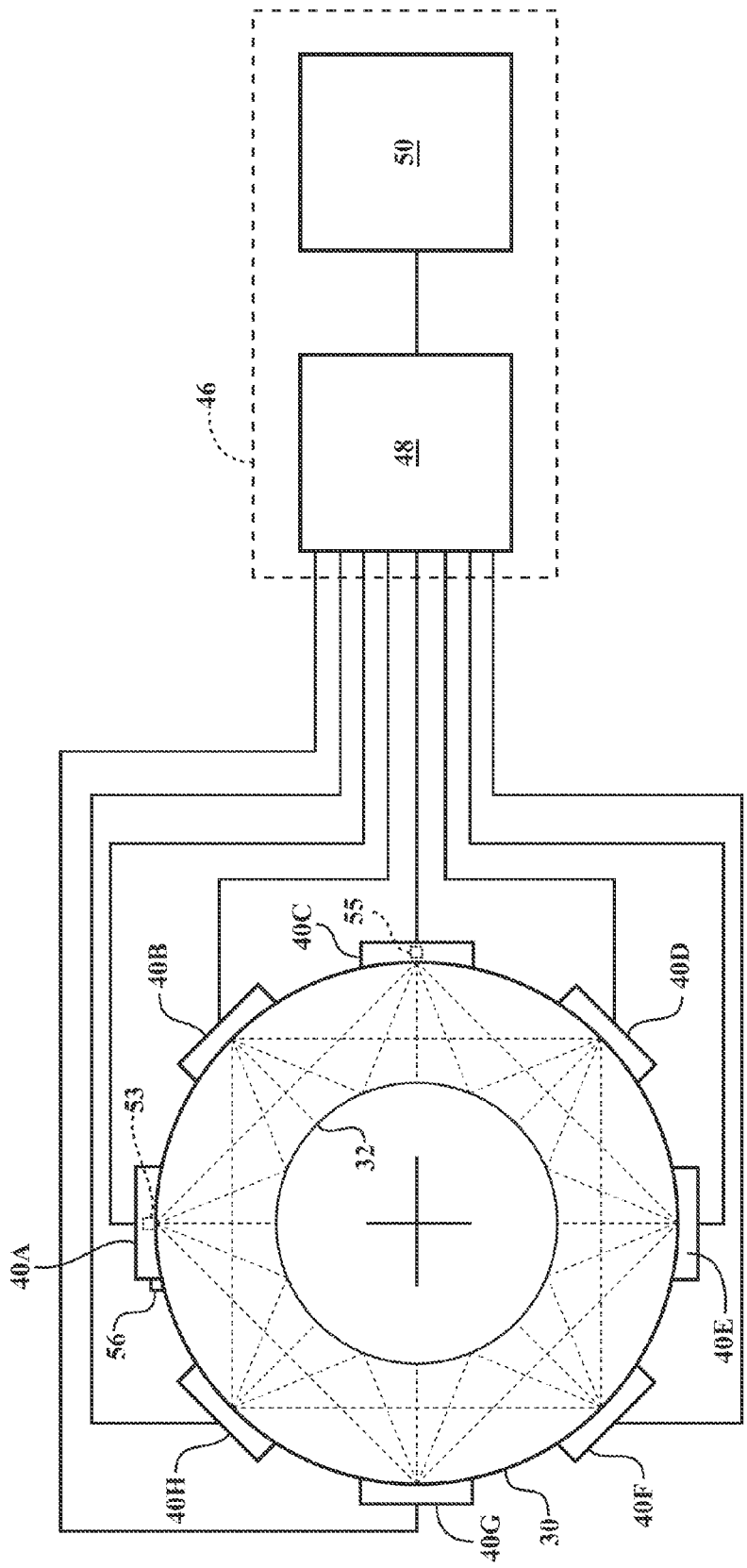
FIG. 2 is a diagrammatic view of an embodiment of the acoustic pyrometer system of present invention.

A diagrammatic view of the acoustic pyrometer system 10 is illustrated in FIG. 2, taken at a cross-section of the engine 12 along line 2-2. The system 10 comprises a plurality of transmitters and receivers, illustrated herein as a plurality of transducers 40 (only one transducer 40 shown in FIG. 1), supported on the outer shell 30. In FIG. 2, eight transducers are shown and are designated as transducers 40A-H for the present description. However, it should be understood that, within the spirit and scope of the present invention, a greater number or fewer transducers 40 may be provided to perform a temperature sensing operation. For example, it may be desirable to provide a greater number of transducers to provide greater accuracy in mapping of temperatures within the flow path 39, as is described in greater detail below. Each of the transducers 40 includes a portion that may extend through the outer shell 30 to emit acoustic signals and to receive acoustic signals. The transducers 40 are connected to a control unit or controller 46 including a data acquisition and processing unit 48 that is configured to control the transducers 40 to produce predetermined output signals and to receive time-of-flight signals corresponding to the output signals (see FIG. 8). The data acquisition and processing unit 48 is further configured to store and process data corresponding to the received signals to calculate temperatures and to produce outputs in accordance with the calculated temperatures associated with the received signals. The controller 46 additionally comprises a combustion control unit 50 receiving signals from the data acquisition and processing unit 48 to output control signals for controlling operations affecting combustion, including signals to the individual combustors 22, providing control of, for example, the fuel/air ratio at the combustors 22.

During a data acquisition operation, at least one of the transducers 40 may comprise a transmitting transducer 40 producing a signal that traverses the hot gas flow path 39 in the plane of the system 10, and at least one the transducers 40 may comprise a receiving transducer 40, which may be a different transducer 40 or the same transducer 40 as the transmitting transducer 40. The time-of-flight of a signal traveling between the transmitting and the receiving transducers 40 may be used to determine an average temperature of the gas through which the signal has traveled. Specifically, the present invention uses the principle that the speed of sound in a gas changes as a function of temperature. For a determined or known composition of the gas, it is possible to determine the temperature of the gas based on the measured time for an acoustic or sound signal to travel the distance between the transmitting and receiving transducers 40, i.e., based on the speed of the sound signal traveling through the gas. The temperature, T (° C.), of the gas may be calculated using the equation:

$$T = \left(\frac{d}{B * t}\right)^2 - 273.16$$

where:

$$B = \text{acoustic constant} = \sqrt{\frac{\gamma * R}{M}}, \text{(m/s)}$$

$\gamma$ = ratio of specific heats of the gas $R$ = universal gas constant, 8.314 J/mole − °K.

$M$ = molecular weight of the gas (Kg/mole)

$d$ = distance traveled by sound signal (m)

$t$ = time-of-flight of the sound signal (s)

Figure 3:
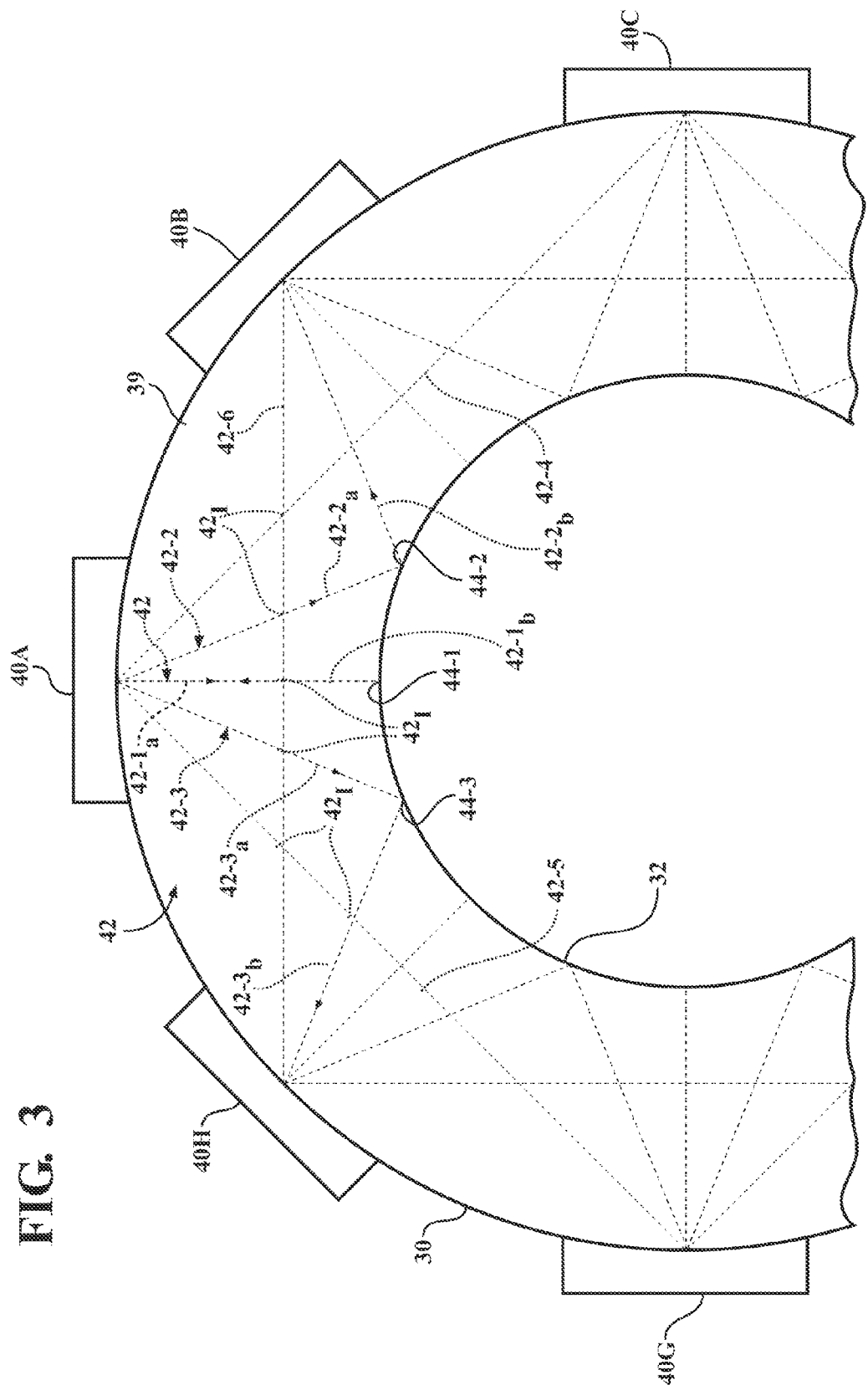
FIG. 3 is an enlarged view of a portion of FIG. 2 illustrating exemplary line-of-sound paths.

Referring to FIG. 3, exemplary line-of-sound paths for the transducers 40A-H will be described with reference to the transducers 40A, 40B and 40H. When the transducer 40A produces an acoustic signal, a plurality of line-of-sound paths 42 are defined within the flow path 39 defined between the outer shell 30 and the hub structure 32. A first line-of-sound path 42-1 extends radially inwardly toward the hub structure 32 and reflects off the hub structure 32 perpendicular to a first reflection point 44-1 on the surface of the hub structure 32. The first line-of-sound path 42-1 comprises a first path segment 42-1$_a$ extending from the transducer 40A to the reflection point 44-1, and a second path segment 42-1$_b$ extending from the reflection point 44-1 to the transducer 40A. A second line-of-sound path 42-2 extends at an angle toward the hub structure 32 in the direction of the transducer 40B, and reflects off the hub structure 32 at a second reflection point 44-2 in a direction toward the transducer 40B. The second line-of-sound path 42-2 comprises a first path segment 42-2$_a$ extending from the transducer 40A to the reflection point 44-2, and a second path segment 42-2$_b$ extending from the reflection point 44-2 to the transducer 40B. A third line-of-sound path 42-3 extends at an angle toward the hub structure 32 in the direction of the transducer 40H, and reflects off the hub structure 32 at a third reflection point 44-3 in a direction toward the transducer 40H. The third line-of-sound path 42-3 comprises a first path segment 42-3$_a$ extending from the transducer 40A to the reflection point 44-3, and a second path segment 42-3$_b$ extending from the reflection point 44-3 to the transducer 40H. In addition, fourth and fifth line-of-sound paths 42-4 and 42-5, respectively, extend from the transducer 40A to the respective transducers 40C and 40G. The fourth and fifth line-of-sound paths 42-4 and 42-5 extend along a direct line-of-flight between the transducer 40A and the transducers 40C and 40G.

It should be understood that a plurality of line-of-sound paths 42 similar to those described for the transducer 40A may be associated with the other transducers 40B-H in the acoustic pyrometer system 10. Each of the plurality of line-of-sound paths 42 provides an average temperature measurement of the gas along the particular line-of-sound path 42. Hence, a plurality of average temperature measurements may be provided traversing across the annular space forming the flow path 39 at the exit to the turbine section 18.

Further, a plurality of intersections $42_I$ of the line-of-sound paths are defined by intersections of the reflected line-of-sound paths 42-1 through 42-3 with the direct line-of-flight line-of-sound paths 42-4 and 42-5, as well as intersections with the direct line-of-flight line-of-sound paths of adjacent transducers 40, e.g., intersections of the line-of-sound paths 42-1, 42-2 and 42-3 with a direct line-of-sound path 42-6 between transducers 40B and 40H. The data associated with each pair of intersecting line-of-sound paths 42 may be compared to each other to validate the temperature data corresponding to the pair of line-of-sound paths 42. In particular, the average temperature of each intersecting pair of line-of-sound paths 42 should be substantially the same, i.e., have a substantially similar temperature at the intersection $42_I$, and a substantial variation in temperature between an intersecting pair of line-of-sound paths 42 may provide an indication that the data provided by at least one of the pair of intersecting line-of-sound paths 42 may be invalid.

Figure 4:
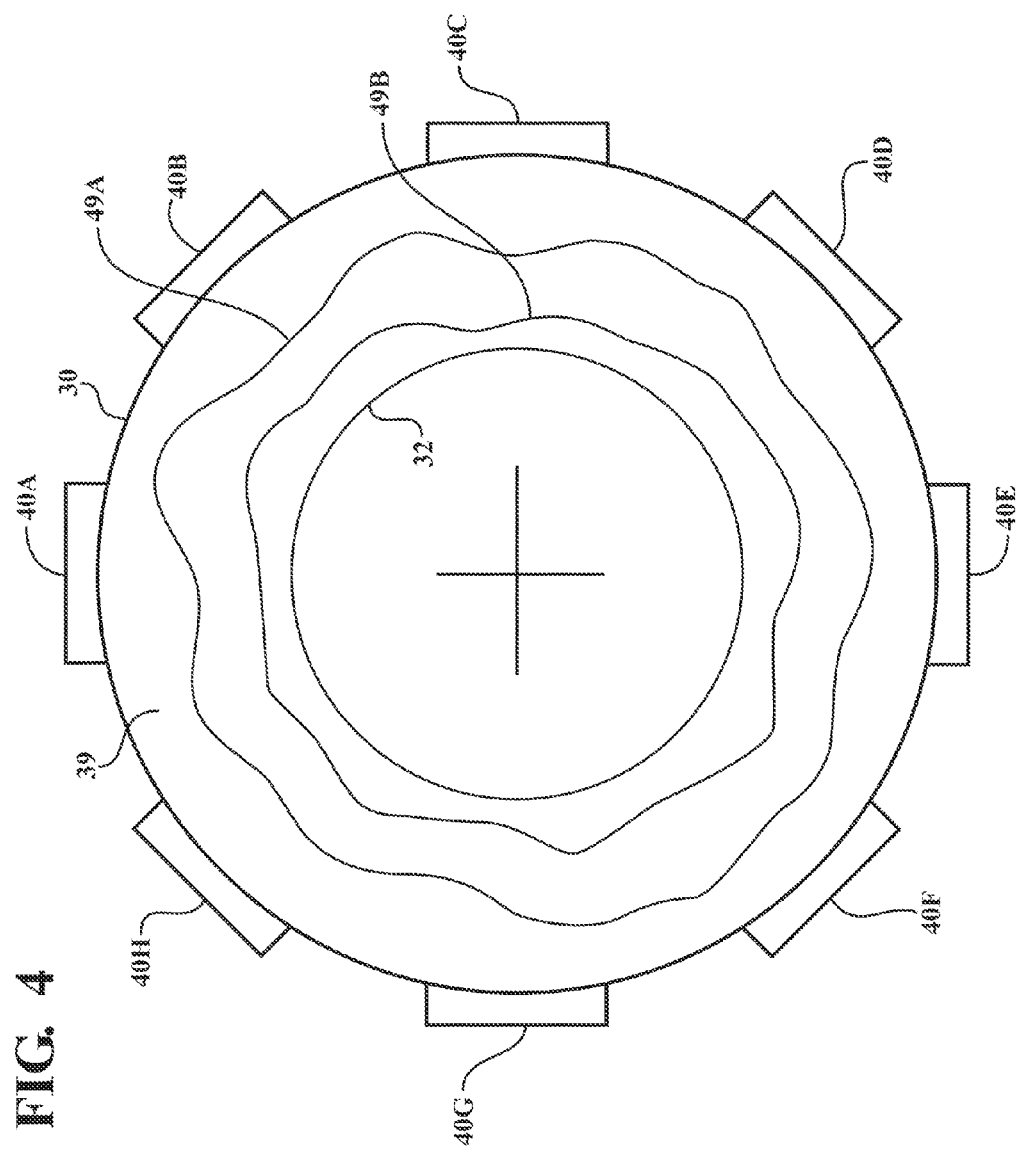
FIG. 4 is a diagrammatic view illustrating exemplary isotherms that may define a temperature map determined by the acoustic pyrometer system of the present invention.

Time-of-flight data corresponding to each of the plurality of line-of-sound paths 42 may be transmitted to the data acquisition and processing unit 48 to map the temperatures in the measurement plane of the acoustic pyrometer system 10, i.e., in the plane of line 2-2 in FIG. 1, wherein temperatures may be determined at a plurality of points within the radial and circumferential extent of the annular space at the exit of the turbine section 18. For example, a plurality of isotherms for temperatures in the flow path 39 may be mapped, as is illustrated by two exemplary isotherms 49A and 49B superposed on an outline of the flow path 39 in FIG. 4.

The time-of-flight data may be acquired from the transducers 40 sequentially in time. That is, the transducers 40 may each be activated at a different time to produce an output acoustic signal in order to enable identification of the signal source, i.e., the transmitting transducer 40, relative to the receiving transducers 40 that receive and provide time-of-flight data signals to the data acquisition and processing unit 48. Alternatively, two or more output signals may be transmitted from two or more of the transducers 40 simultaneously, such that there is little or no time difference between measurements provided by the different output signals at a plurality of locations in the flow path 39 to provide simultaneous temperature data from a plurality of the transducers 40. In particular, each of the transducers 40 may transmit an output signal at a different frequency than any other transducer 40. Hence, the source of each transmitted signal may have a distinctive frequency that may be identified by the data acquisition and processing unit 48 when the signals are received at the receiving transducers 40, such that each of the two or more output signals transmitted simultaneously may be uniquely identified by their frequency.

The acoustic pyrometer system 10 preferably may operate in a frequency range of from about 0.5 kHz to about 4 kHz. The energy of acoustic signals is generally greater at lower frequencies, enabling the signals to travel a longer distance. Hence, it may be desirable to provide output signals having a lower frequency. Further, in a configuration in which the transducers 40 produce output signals at different frequencies, it may be preferable that the variation between output signal frequencies be small in order that all of the output signals may have a similar energy, for example, by providing an output signal frequency for each of the signals near the lower end of the frequency range.

As discussed above, each line-of-sound path, comprises a known distance between transmitting and receiving transducers 40. Hence, for a given data collection event comprising the collection of data from the receiving transducers 40 at a predetermined time, or within a predetermined time frame for sequential data produced by sequential output signals from the transducers 40, a plurality of temperature measurements may be provided traversing across different sections of the measurement plane. The data acquisition and processing unit 48 may process the plurality of temperature measurements by a cross-correlation technique to determine the temperature of the gas flow at different locations radially and circumferentially across the measurement plane.

Figure 8:
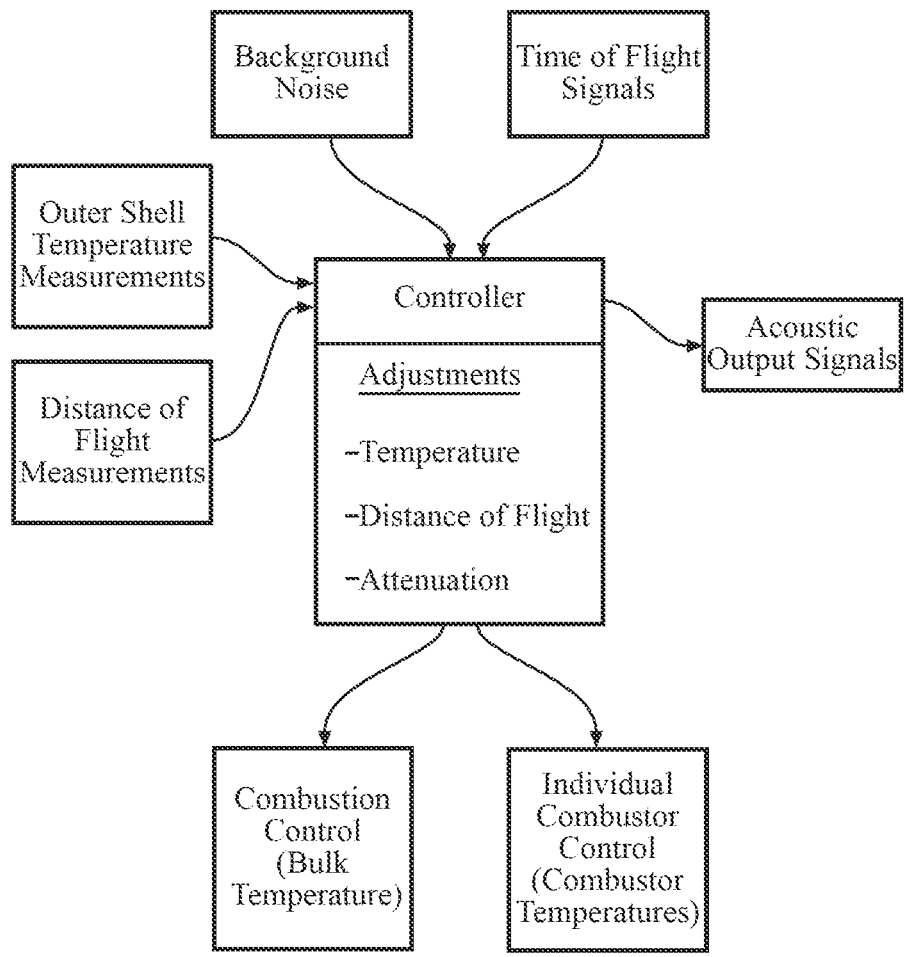
FIG. 8 is a flow diagram illustrating operation of the acoustic pyrometer system to control a gas turbine engine.

In accordance with an aspect of the invention, the temperatures determined at the measurement plane of the acoustic pyrometer system 10 may be used to determine both a bulk exhaust temperature and to determine individual operating temperatures for each of the combustors 22 (FIG. 8). With regard to the bulk temperature measurement, the acoustic pyrometer system 10 determines average temperatures across multiple paths 42 that may be used to provide a true bulk average temperature at the measurement plane defined by the acoustic pyrometer system 10. In particular, the data acquisition and processing unit 48 may determine a bulk or global exhaust temperature across the flow path 39 that may be used by the controller 46 to control overall combustion operations, such as controlling a firing temperature in the combustion section 16.

Figure 5:
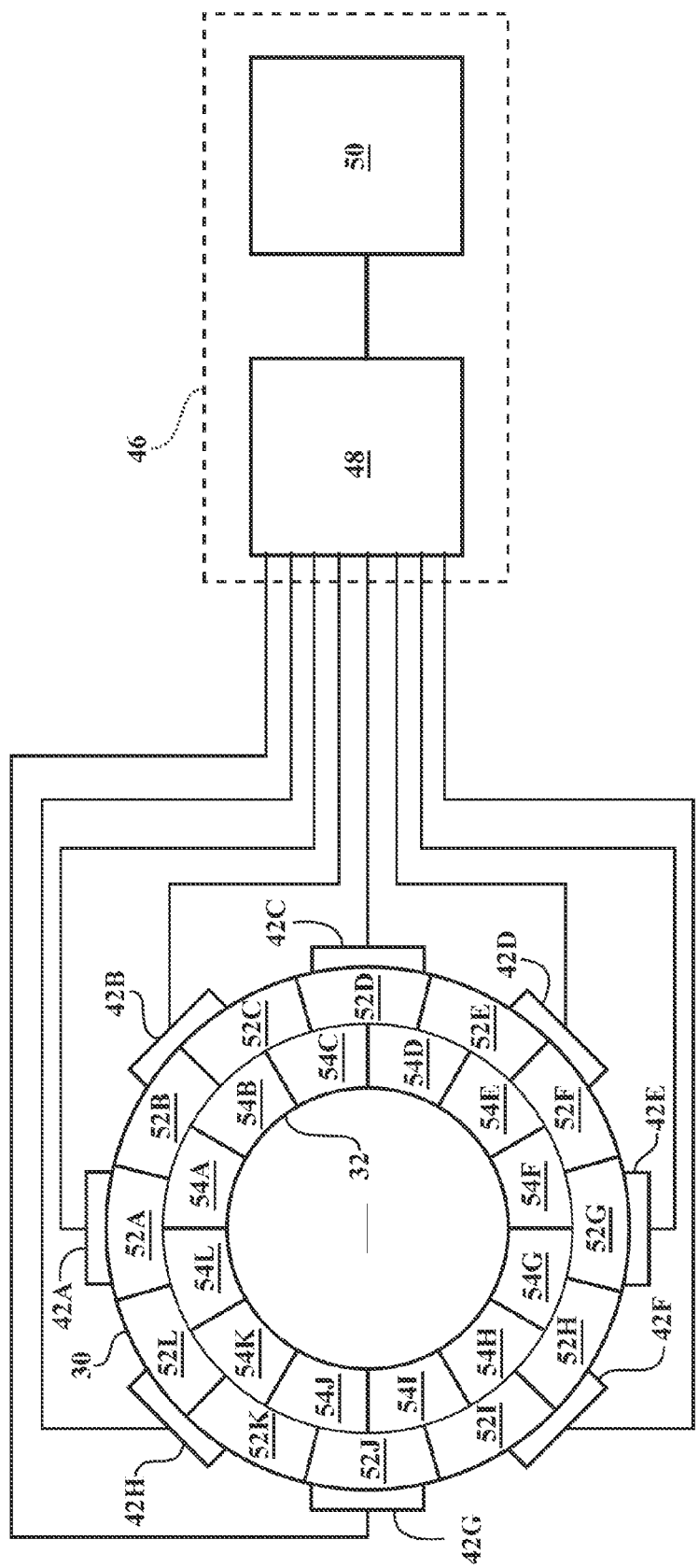
FIG. 5 is a diagrammatic view illustrating exemplary temperature regions that may be determined in accordance with a method of the present invention.

The data acquisition and processing unit 48 may also determine temperatures at each of the combustors 22 to ensure proper operation of the individual combustors 22. For example, referring to FIG. 5, outer and inner temperature regions 52, 54, specifically identified as outer regions 52A-L and inner regions 54A-L, may be defined for use in identifying the temperature at circumferential and radial locations of regions in the measurement plane defined by the acoustic pyrometer system 10. The temperature for each region of the outer region 52A-L and inner region 54A-L may be an average temperature for the area covered by the particular region. The number of regions for each of the outer and inner regions 52A-L, 54A-L may correspond to the number of combustors 22, i.e., corresponding to twelve combustors 22 in the exemplary embodiment. Although the measurement plane of the acoustic pyrometer system 10 is displaced axially downstream of the individual combustors 22 and the turbine section 18, it is possible to infer the temperature at each individual combustor 22 based on the measurements at the measurement plane. That is, the temperature at each of the regions 52A-L and/or 54A-L may be used to determine the temperature at a combustor 22 wherein the regions 52A-L and/or 54A-L corresponding to a combustor 22 will typically be displaced circumferentially relative to the associated combustor 22 due to the rotational flow of the exhaust gases through the turbine section 18. The temperature of the combustors 22, as determined by the data acquisition and processing unit 48, may be used to determine an output of the combustion control unit 50 to control the fuel and/or air flow to each of the respective combustors 22 to avoid flame-out of individual combustors 22, as well as to provide combustor-to-combustor flame temperature variation information for feed back control for optimized, energy-efficient combustion. Hence, the temperature measurements provided by the transducers 40 may provide both a global temperature measurement and individual temperature measurements of the combustors 22 at a common axial location defined by the plane of the acoustic pyrometer system 10.

As noted above, the particular location of the measurement plane may be selected based on the particular configuration and operation of the engine, and is preferably adjacent a last stage 34 of the turbine section 18. In particular, the location of the measurement plane is preferably at an axial location in the exhaust section 20 where the working gas exiting the turbine section 18 has not substantially mixed within the exhaust section 20. For example, the measurement plane may preferably be located at an upstream region of the exhaust section 20 prior to substantial expansion of the gases through the diffuser 28 of the exhaust section 20, such that individual temperature measurements corresponding to the individual combustors 22 may be obtained. It may also be noted that obtaining the average temperature measurements corresponding to different portions of the flow path 39 traversed by the line-of-sound paths 42 further permits the location of the measurement plane to be used for determining a bulk temperature of the working gas as it exits the turbine section 18 and passes through the exhaust section 20.

It should be understood that the spacial resolution of the temperature map provided by the transducers 40 may be increased by increasing the number of the transducers 40 around the circumference of the outer shell 30 at the measurement plane of the acoustic pyrometer system 10. Further, it should be understood that although particular outer and inner regions 52, 54 are described for designating temperatures within the measurement plane of the acoustic pyrometer system 10, a different number of regions may selected for identifying temperatures in both the radial and circumferential directions. Also, it should be understood that the regions, as used by the data acquisition and processing unit 48 for determining combustor temperatures, may comprise temperatures at point locations within the measurement plane, such as may be determined from the temperature map, as generally depicted by the isotherm map of FIG. 4. The locations of the temperature regions 52, 54 or point locations may each correspond to a "hot spot" in the exhaust flow corresponding to the outlet temperature of exhaust from a predetermined one of the combustors 22.

During operation of the engine 12, the load on the engine 12 may change, such as in changing from a base load operation, i.e., a design operating point, of the engine 12 to a partial load operation of the engine 12. As a result of a change in load on the engine 12, the condition of the gas flow may vary, and the locations of the hot spots corresponding to each of the combustors 22 may change radially and/or circumferentially. In the past, temperature sensors, such as thermocouples have been mounted at fixed locations on thermocouple rakes in the exhaust section 20 of the turbine engine 12, wherein the locations of the thermocouples were optimized for steady state base load operation of the engine. In accordance with an aspect of the present invention, the temperature measurement locations, i.e., the regions 52 and 54, designated for providing temperatures corresponding to each of the combustors 22, may be changed in real time to provide an optimum temperature measurement location for each load condition of the engine 12, or for varying load conditions of the engine 12. For example, as the load on the turbine engine 12 changes from a base load to a partial load condition, the temperature monitoring locations may be adjusted or changed in the radial and/or circumferential directions within the annulus between the outer shell 30 and the hub structure 32 in the plane of the acoustic pyrometer system 10. That is, a first set of temperature monitoring locations may be selected, corresponding to each of the combustors 22, for a base load operation of the engine 12, and a second, different set of temperature monitoring locations may be selected, corresponding to each of the combustors 22, for a partial load operation of the engine 12. Hence, the acoustic pyrometer system 10 may provide an increased accuracy of the temperature measurements used for controlling operation of the engine 12 throughout a range of varying operating conditions.

It should be noted that the distance along the line-of-sound paths 42 may vary slightly due thermal expansion and/or distortion of the outer shell 30. In accordance with an aspect of the invention, a non-intrusive distance measuring device may be included in the acoustic pyrometer system 10 to provide distance-of-flight measurements (FIG. 8). For example, a laser triangulation, time-of-flight measurement may be provided by laser emitting devices and detectors built into the transducers 40, as is depicted diagrammatically by an exemplary laser emitter 53 and receiver 55 in FIG. 2, and providing a measurement between each pair of transmitting and receiving transducers 40. That is, a plurality of laser emitter and receivers, similar to the illustrated laser emitter 53 and receiver 55, may be provided associated with a plurality of transducers 40. The measurements from the distance measuring devices may be used to determine the thermal expansion and/or distortion of the outer shell 30, and may be used by the data acquisition and processing unit 48 to correct for variations in distance of the line-of-sound paths 42.

In accordance with a further aspect of the invention, one or more temperature sensors may be provided on the outer shell 30, such as is illustrated by a thermocouple 56 associated with the transducer 40A (FIG. 2). For example thermocouples 56 may be provided as part of or associated with each of the transducers 40 to provide a temperature measurement at the inner surface of the outer shell 30 at or adjacent to the measurement plane. The temperature measurement at the outer shell 30 may be provided to the controller 46 to adjust or correct the temperature measurements provided by the transducers 40 for a boundary layer temperature gradient at the wall of the outer shell 30 (FIG. 8).

In accordance with a further aspect of the invention, background noise at the measurement plane of the acoustic pyrometer system 10 may be detected by the transducers 40. The background noise received by the transducers 40 may be input to the controller 46 (FIG. 8) and provided to the data acquisition and processing unit 48 and processed as a background noise level used to adjust a noise level attenuation for signals received by the transducers 40. In particular, the noise level within the engine 12 will change, depending on the load condition of the engine 12. The data acquisition unit 48 may monitor the noise level and adjust an attenuation threshold to filter the output signals from the transceivers 40 for the noise level, such as by increasing the threshold for attenuation as the noise level increases. Hence, the present acoustic pyrometer system 10 may provide an adjustable acoustic measurement that varies the sensing sensitivity with varying noise, so that the detection of the signals may be optimized to the extent possible with respect to the ambient sound, i.e., noise, in the combustion system.

Figure 6:
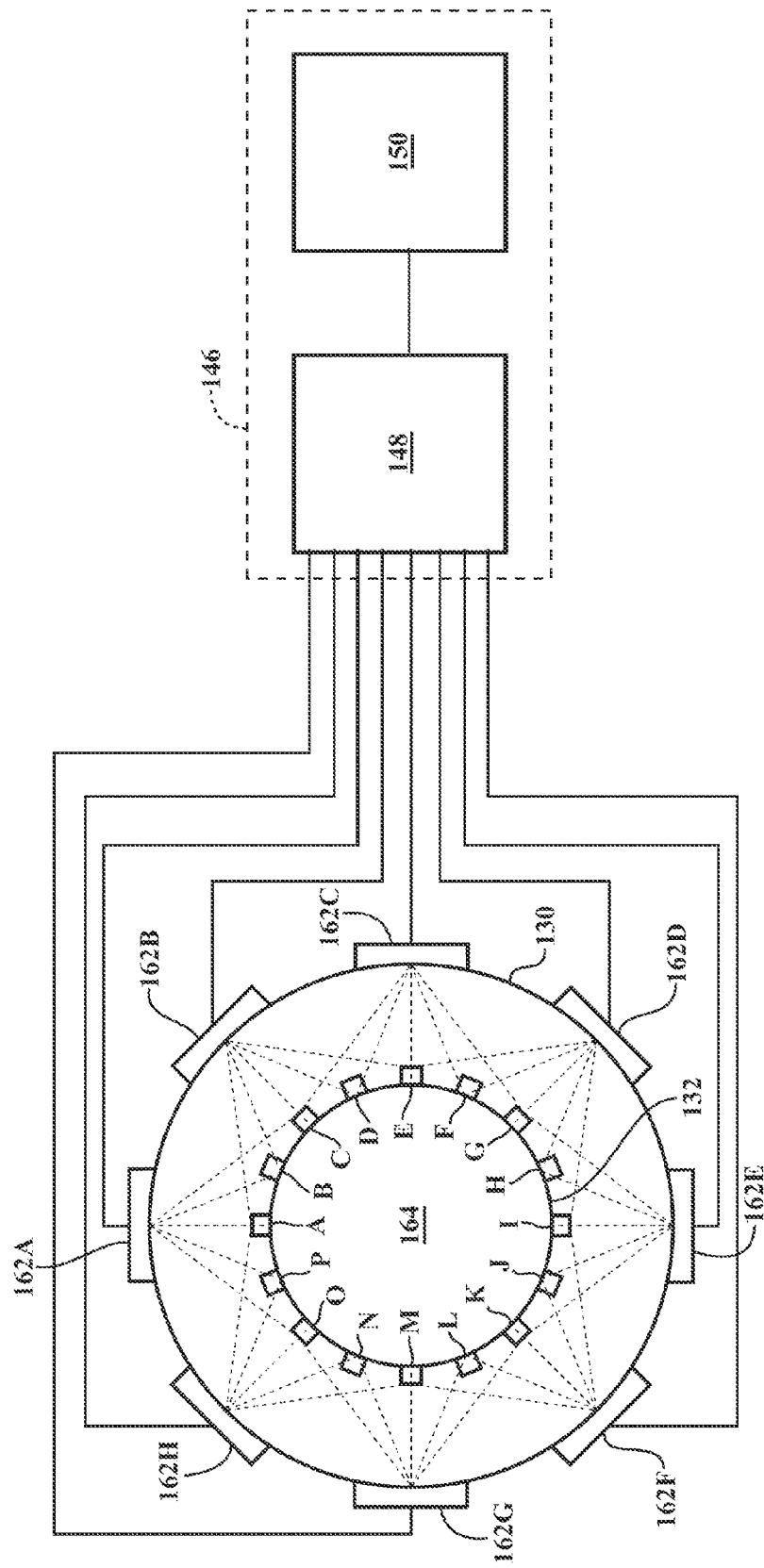
FIG. 6 is a diagrammatic view of an alternative embodiment of the acoustic pyrometer system of present invention.

Referring to FIG. 6, an alternative embodiment of the acoustic pyrometer system 10 is illustrated and identified as acoustic pyrometer system 110. Elements of the acoustic pyrometer system 110 corresponding to the acoustic pyrometer system 10 are identified with the same reference numeral increased by 100.

The acoustic pyrometer system 110 may be provided at the same location within the exhaust section 20 of a turbine engine 12 as is described for the acoustic pyrometer system 10 above. The acoustic pyrometer system 110 includes a plurality of transmitters and receivers, illustrated herein as a plurality of acoustic or sound emitting transmitters 162, identified as transmitters 162A-H, located on the outer shell 130, and a plurality of receiving microphones 164, identified as microphones 164A-P, located on the hub structure 132. It should be understood that the locations of the transmitters 162 and microphones 164 may be reversed, or transceivers may be provided in place of the transmitters 162 and microphones 164.

The transmitters 162 and microphones 164 are connected to a control unit or controller 146 including a data acquisition and processing unit 148 that is configured to control the transmitters 162 to produce predetermined output signals and to receive time-of-flight signals from the microphones 164 corresponding to the output signals. The data acquisition and processing unit 148 further stores and processes data corresponding to the received signals to produce outputs in accordance with calculated temperatures associated with the received signals. The controller 146 additionally comprises a combustion control unit 150 receiving signals from the data acquisition and processing unit 148 to output control signals for controlling operations affecting combustion in a manner similar to that described above for the data acquisition and processing system 10

Figure 7:
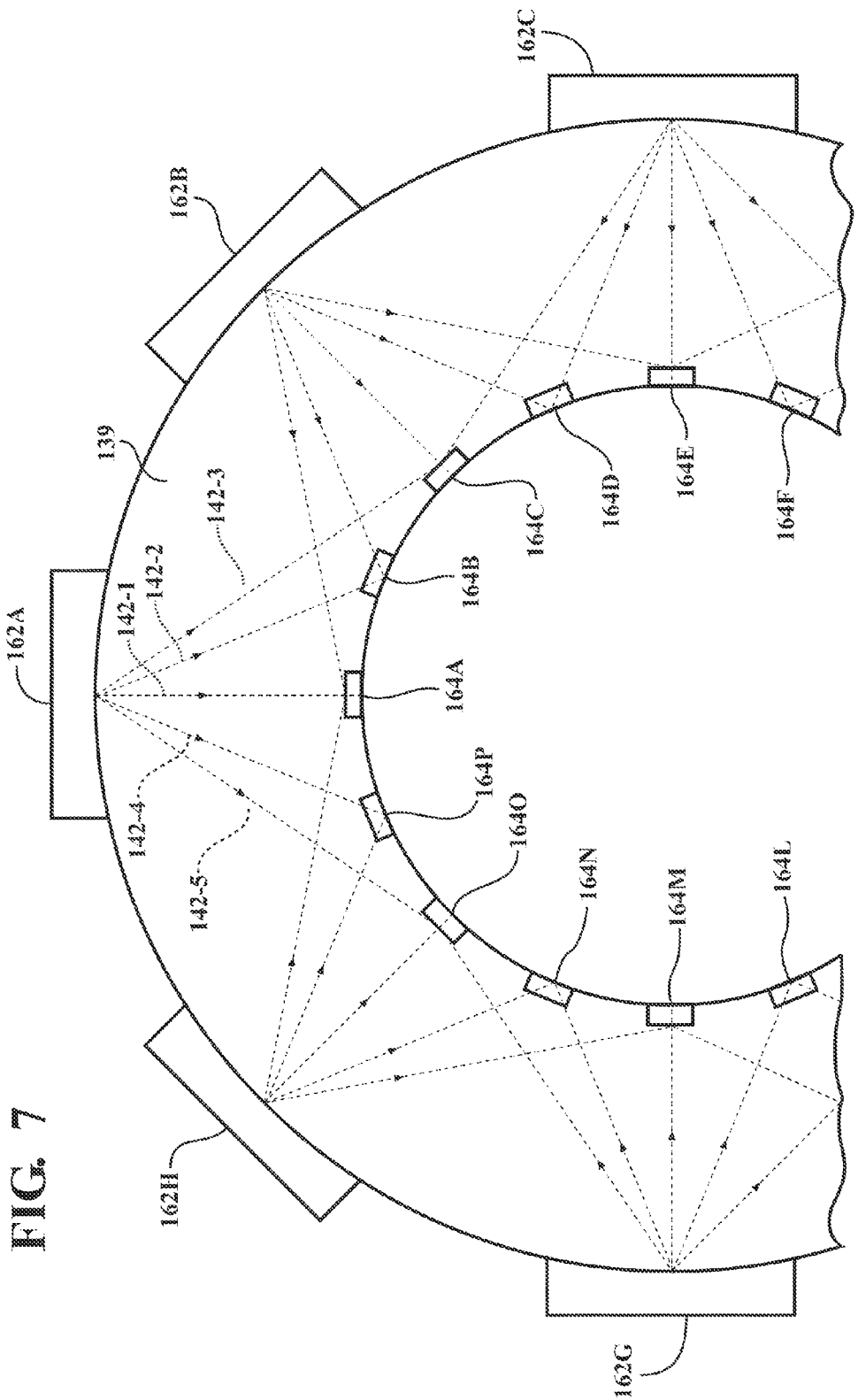
FIG. 7 is an enlarged view of a portion of FIG. 6 illustrating exemplary line-of-sound paths.

Referring to FIG. 7, exemplary line-of-sound paths for the output signals provided by the transmitter 162A will be described. When the transmitter 162A produces an acoustic signal, a plurality of line-of-sound paths 142 are defined within a flow path 139 defined between the outer shell 130 and the hub structure 132. A first line-of-sound path 142-1 extends radially inwardly toward the microphone 164A. A second line-of-sound path 142-2 extends radially inwardly toward the microphone 164B. A third line-of-sound path 142-3 extends radially inwardly toward the microphone 164C. A fourth line-of-sound path 142-4 extends radially inwardly toward the microphone 164P. A fifth line-of-sound path 142-5 extends radially inwardly toward the microphone 164N.

It should be understood that a plurality of line-of-sound paths 142 similar to those described for the transmitter 162A may be associated with the other transmitters 162B-P. Further, the line-of-sound paths 142 of each transmitter 162 intersect line-of-sound paths 142 of the adjacent transmitters 162, such that verification of the data associated with pairs of intersecting line-of-sound paths 142 may be performed, as described above for the acoustic pyrometer system 10. The microphones 164 receiving acoustic signals from the transmitters 162 provide output signals to the data acquisition and processing unit 148 which determines time-of-flight data for each line-of-sound path 142, to provide an average temperature measurement of the gas along each line-of-sound path 142. Hence, the time-of-flight data of the transmitters 162 and microphones 164 may be used to determine a temperature map of the plane defined by the acoustic pyrometer system 110 to control operation of the turbine engine in a manner similar to that described for the acoustic pyrometer system 10. The plural direct line-of-sound paths 140 provided by the acoustic pyrometer system 110 may provide a reduction in an uncertainty of the data provided to the data acquisition and processing unit 148 in that the acoustic signals providing the data of the system 110 do not reflect off structure within the exhaust section 20. That is, the acoustic pyrometer system 110 may provide additional accuracy to the data by providing shorter path lengths with each line-of-sound path 142 providing a direct line-of-flight between the signal transmitter 162 and microphone (receiver) 164.

The acoustic pyrometer system 10, 110 of the present invention provides a combined temperature measurement function that permits elimination of a sensor location typically provided for sensing an exhaust temperature in a turbine engine. In particular, the present invention provides temperature measurements comprising individual combustor temperature measurements and a bulk or global exhaust temperature measurement in a common measurement plane downstream from the turbine section 18. The present system may be used to replace existing exhaust temperature measurement systems, such as both blade path thermocouple rakes at the exit to the turbine section and bulk exhaust temperature thermocouple rakes located downstream in the exhaust section that may be provided in a typical turbine exhaust temperature sensing system.

Further, the acoustic pyrometer system 10, 110 provides a configuration in which the temperature measurement elements, e.g., the transceivers 40 or the transmitters 162 and receivers 164, are located out the path 39, 139 of the hot gas flow. In addition, mounting of the transceivers 40 or transmitters 162 to the outer shell 32, 132 may permit replacement of these components without stopping operation of the turbine engine 12, reducing inefficiencies associated with maintenance of the temperature sensor system for the engine 12.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method operating a gas turbine engine, including determining a temperature of a working gas passing through a flow path within the gas turbine engine, the method comprising the steps of:
    transmitting acoustic signals from a plurality of acoustic transmitters located at a predetermined axial location adjacent to and downstream from a last stage of a turbine section of the gas turbine engine;
    receiving the acoustic signals from the acoustic transmitters at a plurality of acoustic receivers located at the predetermined axial location;
    each acoustic signal comprising a distinct line-of-sound path from one of the acoustic transmitters to an acoustic receiver corresponding to the line-of-sound path;
    determining, using a processor, a time-of-flight for the signals traveling along each of the line-of-sound paths; and
    processing, via a processor, the time-of-flight for the signals traveling along the line-of-sound paths to determine a temperature in a region of the predetermined axial location.

2. The method of claim 1, including transmitting acoustic signals for determining the time-of-flight along the line-of-sound paths at a predetermined time interval between a time of transmission of each of the acoustic signals.

3. The method of claim 1, including at least one of the acoustic transmitters transmitting at least one of the acoustic signals at a frequency that is different from the frequencies of the other acoustic signals, and wherein the at least one acoustic signal is transmitted simultaneously with at least one other acoustic signal of a different frequency transmitted from another acoustic transmitter.

4. The method of claim 1, wherein the plurality of acoustic transmitters are distributed around an outer boundary of the flow path, and including processing the time-of-flight for each of the acoustic signals to determine a plurality of local temperatures for the working gas in a corresponding plurality of regions distributed in a plane extending across the flow path at the predetermined axial location.

5. The method of claim 4, wherein the plurality of regions are distributed circumferentially around an axis of the gas turbine engine extending parallel to the flow path.

6. The method of claim 5, wherein the plurality of regions are further distributed radially between the outer boundary of the flow path and the axis of the gas turbine engine.

7. The method of claim 5, including the steps of:
matching each of the regions circumferentially with a corresponding one of a plurality of combustors of the turbine engine; and
controlling a fuel/air mixture of each of the combustors with reference to the local temperature at a corresponding region.

8. The method of claim 4, wherein the plurality of regions distributed in the plane extending across the flow path comprise a first set of point temperature measurements within the flow path, and including a second set of point temperature measurements located at different locations within the flow path than locations of the first set of point temperature measurements, and including the steps of:
monitoring the temperatures in the flow path at the first set of point temperature measurements and controlling an operating parameter of the gas turbine engine based on the temperatures at the first set of point temperature measurements during a first operating condition of the gas turbine engine; and
monitoring the temperatures in the flow path at the second set of point temperature measurements and controlling the operating parameter of the gas turbine engine based on the temperatures at the second set of point temperature measurements during a second operating condition of the gas turbine engine different from the first operating condition.

9. The method of claim 8, wherein the first operating condition of the gas turbine engine comprises a base load operation of the gas turbine engine, and the second operation condition of the gas turbine engine comprises a partial load operation of the gas turbine engine.

10. The method of claim 4, further including processing the time-of-flight for each of the acoustic signals to determine a bulk temperature comprising an average temperature for the working gas at the plane extending across the flow path at the predetermined axial location.

11. The method of claim 4, wherein each acoustic transmitter and acoustic receiver defines a transceiver, and the transceivers are circumferentially spaced around the outer boundary of the flow path, and including an inner boundary located radially inwardly from an outer boundary, and at least some of the line-of-sound paths comprise first and second path segments, the first path segment extending from a transmitting transceiver to the inner boundary and the second path segment extending from the inner boundary to a receiving transceiver.

12. The method of claim 1, including providing a distance measuring device and determining a distance measurement from at least one of the acoustic transmitters to at least one of the acoustic receivers, and correcting the determination of the temperature in the region of the predetermined axial location where the at least two line-of-sound paths intersect with reference to the distance measurement.

13. The method of claim 1, including measuring a background noise level at the predetermined axial location and adjusting an attenuation level for filtering the acoustic signals received by the acoustic receivers with reference to the background noise level during processing of the time-of-flight signals to determine the temperature in the region of the predetermined axial location where the at least two line-of-sound paths intersect.

14. The method of claim 1, including obtaining a wall temperature measurement at the predetermined axial location, and inputting the wall temperature measurement to provide a boundary layer temperature gradient during processing of the time-of-flight signals to determine the temperature in the region of the predetermined axial location where the at least two line-of-sound paths intersect.

15. The method of claim 1, wherein at least two of the line-of-sound paths intersect within the flow path, and comparing the temperatures determined for each of the at least two line-of-sound paths to verify an accuracy of the temperature provided by each of the at least two line-of-sound paths.

16. A gas turbine engine including an apparatus for controlling operation of the gas turbine engine comprising:
a plurality of acoustic transmitters located circumferentially on a boundary structure defining a flow path for a working gas passing through the gas turbine engine, the plurality of acoustic transmitters located at a predetermined axial location adjacent to and downstream from a turbine section of the gas turbine engine;
a plurality of acoustic receivers located circumferentially around the boundary structure defining the flow path at the predetermined axial location;
a plurality of line-of-sound paths defined by acoustic signals, each acoustic signal transmitted from an acoustic transmitter and received by an acoustic receiver for a respective line-of-sound path; and
a controller configured to determine a time-of-flight for the acoustic signals traveling along each of the line-of-sound paths, and the controller being configured to process a measured time-of-flight for the signals traveling along the line-of-sound paths to determine a local temperature in each of a plurality of locations located circumferentially around the flow path at the predetermined axial location.

17. The gas turbine engine of claim 16, wherein the gas turbine engine comprises a combustion section, and the controller being configured to calculate a bulk exhaust gas temperature of the working gas at the predetermined axial location, the bulk temperature comprising an average of the temperatures at the plurality of locations, and the controller being configured to control a firing temperature in the combustion section with reference to the bulk temperature.

18. The gas turbine engine of claim 16, wherein each acoustic transmitter and acoustic receiver defines a transceiver, and the transceivers are circumferentially spaced around a circumferentially outer boundary of the boundary structure.

19. The gas turbine engine of claim 18, wherein the boundary structure comprises an inner boundary and at least some of the line-of-sound paths comprise first and second path segments, the first path segment extending from a transmitting transceiver to the inner boundary and the second path segment extending from the diffuser to a receiving transceiver.

20. The gas turbine engine of claim 16, wherein the boundary structure comprises an inner boundary located radially inwardly from an outer boundary of the boundary structure, and one of the acoustic transmitters and the acoustic receivers being located on one of the inner boundary and the outer boundary, and the other of the acoustic transmitters and the acoustic receivers being located on the other of the inner boundary and the outer boundary.

* * * * *